(12) United States Patent
Kisters

(10) Patent No.: US 10,720,003 B2
(45) Date of Patent: Jul. 21, 2020

(54) SECURITY DEVICE AND AUTHENTICATION METHOD WITH DYNAMIC SECURITY FEATURES

(71) Applicant: Friedrich Kisters, Kreuzlingen (CH)

(72) Inventor: Friedrich Kisters, Kreuzlingen (CH)

(*) Notice: Subject to any disclaimer, the term of this patent is extended or adjusted under 35 U.S.C. 154(b) by 409 days.

(21) Appl. No.: 15/316,466

(22) PCT Filed: Jun. 2, 2015

(86) PCT No.: PCT/EP2015/062227
§ 371 (c)(1),
(2) Date: Dec. 5, 2016

(87) PCT Pub. No.: WO2015/185536
PCT Pub. Date: Dec. 10, 2015

(65) Prior Publication Data
US 2017/0148245 A1 May 25, 2017

(30) Foreign Application Priority Data
Jun. 4, 2014 (DE) .................. 10 2014 007 976

(51) Int. Cl.
*G07D 7/1205* (2016.01)
*B42D 25/36* (2014.01)
(Continued)

(52) U.S. Cl.
CPC ......... *G07D 7/1205* (2017.05); *B42D 25/346* (2014.10); *B42D 25/36* (2014.10);
(Continued)

(58) Field of Classification Search
None
See application file for complete search history.

(56) References Cited

U.S. PATENT DOCUMENTS 5,568,251 A 10/1996 Davies et al.
5,697,649 A 12/1997 Dames et al.
(Continued)

FOREIGN PATENT DOCUMENTS

DE 10304805 A1 8/2004
DE 10 2004 049 139 A1 4/2005
(Continued)

OTHER PUBLICATIONS

International Search Report of International Application No. PCT/EP2015/062227 dated Aug. 7, 2015.
(Continued)

*Primary Examiner* — Christopher Braniff
(74) *Attorney, Agent, or Firm* — Insigne LLP

(57) ABSTRACT

The invention relates to a security device and an authentication method, in which a security element (1) is provided. The security element comprises a support material (6), in which a three-dimensional pattern with structures (4) such as cracks, grooves, flaking, pits, scales, elevations, and/or shrinkages are embedded as static or dynamic security features. Additionally, a material, which is detectable by a scanning device, or a material composition is deposited or incorporated at least partly onto or into the three-dimensional pattern embedded in the support material (6) and is, if necessary, new applicable onto or removable from the security element, whereby the color, intensity, structure, layer thickness, individual pigments or another physical property of the support material (6) and/or the three-dimensional security element (1) pattern embedded into the support material is changed such that an at least partly altered appearance is produced which is detectable by the scanning device at authentication point of time and is storable in the storage device.

16 Claims, 3 Drawing Sheets

(51) Int. Cl.
  *G07D 7/12* (2016.01)
  *G06K 19/08* (2006.01)
  *G06K 19/14* (2006.01)
  *B42D 25/346* (2014.01)
  *B42D 25/378* (2014.01)
  *G07D 7/20* (2016.01)
  *B42D 25/373* (2014.01)

(52) U.S. Cl.
  CPC ......... *B42D 25/373* (2014.10); *B42D 25/378* (2014.10); *G06K 19/086* (2013.01); *G06K 19/14* (2013.01); *G07D 7/12* (2013.01); *G07D 7/20* (2013.01)

(56) References Cited

U.S. PATENT DOCUMENTS

| | | | |
|---|---|---|---|
| 5,719,948 | A | 2/1998 | Liang |
| 6,331,569 | B1 | 12/2001 | Kisters et al. |
| 6,701,615 | B2 | 3/2004 | Harding et al. |
| 8,020,776 | B2 | 9/2011 | Tompkin et al. |
| 2003/0167616 | A1 | 9/2003 | Harding et al. |
| 2004/0107367 | A1 | 6/2004 | Kisters |
| 2004/0229022 | A1 | 11/2004 | Bourdelais et al. |
| 2006/0131518 | A1 | 6/2006 | Ross et al. |
| 2007/0087173 | A1* | 4/2007 | Endres ............... B41M 5/24 428/203 |
| 2011/0060920 | A1 | 3/2011 | Kisters |
| 2011/0107405 | A1 | 5/2011 | Kisters |
| 2011/0247058 | A1 | 10/2011 | Kisters |
| 2012/0175866 | A1* | 7/2012 | Kisters ............... G07C 11/00 283/67 |
| 2013/0067547 | A1 | 3/2013 | Thavasi et al. |
| 2014/0231511 | A1 | 8/2014 | Kisters |

FOREIGN PATENT DOCUMENTS

| | | |
|---|---|---|
| DE | 10 2006 006 323 A1 | 8/2007 |
| DE | 102008050768 B3 | 11/2009 |
| DE | 10 2009 033 221 A1 | 1/2011 |
| DE | 102009039190 A1 | 3/2011 |
| DE | 102010009977 A1 | 9/2011 |
| DE | 102011055297 A1 | 5/2013 |
| EP | 1158459 A1 | 11/2001 |
| GB | 2265482 A | 9/1993 |
| WO | 97/24699 A | 10/1997 |
| WO | 98/57299 A | 12/1998 |
| WO | 01/043086 A | 6/2001 |
| WO | 03/081522 A1 | 10/2003 |
| WO | 2005/025891 A2 | 3/2005 |
| WO | 2005/048182 A2 | 6/2005 |
| WO | 2011/006640 A2 | 1/2011 |
| WO | 2012/038842 A1 | 3/2012 |
| WO | 2013191913 A1 | 12/2013 |

OTHER PUBLICATIONS

English Translation of the Written Opinion of the International Searching Authority issued in International Application No. PCT/EP2015/062227; dated Aug. 7, 2015; 15 pages.

English translation of the International Search Report and Written Opinion of the International Searching Authority issued in International Application No. PCT/EP2015/055624, dated Jun. 12, 2015.

English translation of the International Search Report and Written Opinion of the International Searching Authority issued in International Application No. PCT/EP2015/055626, dated May 28, 2015.

\* cited by examiner

SECURITY DEVICE AND AUTHENTICATION METHOD WITH DYNAMIC SECURITY FEATURES

TECHNICAL FIELD

The present invention relates to a security device and an authentication method, in which a material or a material composition that is detectable via a scanning device is stored or deposited in or on a substrate with an embedded three-dimensional pattern and as required is newly applicable on the security element or removable from the same. This results in an at least partially altered appearance, which is detectable during a further authentication point of time by the scanning device and storable in a storage device as updated version.

STATE OF THE ART

For the protection of documents, objects, goods as well as to authenticate telecommunications equipment or persons a plurality of methods and devices are known. Many of the methods are based on static security features, such as numbers, passwords, biometric features or have a complex static structure, in order to increase protection against forgery. Thus, U.S. Pat. No. 5,719,948 describes a device and a method for fluorescent imaging and optical character reading, the U.S. Pat. No. 5,697,649 describes objects with magnetic security features and the U.S. Pat. No. 5,568,251 describes a material that is anisotropic during absorption, reflection or transmission.

Another group of methods are based on unique physical or chemical security features on the surface of a document or a product. For this purpose, a section of the surface is scanned in accordance with the previously selected physical characteristic features and the scanned image is encoded and/or encrypted. The obtained result is applied to the surface of the object or the document in the form of a number or a code. When checking the authenticity, the surface is scanned by a test device. The thus obtained data are compared with the stored data. One such method is described, for example, in the WO 97/24699 A.

WO 98/57299 describes a document with an authenticity feature, which is formed by a plurality of characteristics embedded in a substrate. These characteristics are arranged in the substrate at random with respect to their location, their distribution density and their spatial position in the substrate. Thereby, arise from the production of documents always unique, those make even a deliberate duplication virtually impossible. This characteristic is a matter of, for example, textile or cellulose fibres, metallic materials or plastics or inorganic substances such as graphite fibres. Besides, scratch-like depressions or elevations are suitable as characteristic in or on the substrate. The depressions or elevations exhibit thereby different width dimensions, depth dimensions or altitude dimensions and/or width courses, depth courses or altitude courses. Besides, cavities can be formed, which form pore-shaped in the substrate. These security features are scanned using a reading device. Although, such security features have a complex pattern, but remain unchanged after their production for subsequent security queries. Using a modern 3-D printing process, it would be also possible to fake such rigid structures anyway.

In WO 01/043086 it is proposed that a unique image is generated as a two-dimensional random image and applied on a selected surface of a material having a rough surface with random characteristics. To that it can be used for example materials with a rough surface such as fibrous, porous material or material with inclusions of particles. In one embodiment, the method also provides that the random image is further modified with arbitrary parameters, in which, for example, the surface is processed by chance, for example, by perforation. Here too, the two-dimensional random image no longer changes after its completion. Although a material is used with a rough surface with random parameters, which shall increase the protection against forgery, but this material remains also static between two authentication points of time and therefore, susceptible to forgery.

In DE 10 2004 049 139 A1 are described a device and a method for protecting an object against forgery or copying, wherein the object is equipped with a transmission device for emitting light, wherein the light from the transmission device changes over time in intensity and/or spectral composition. The temporal change of light is so selected or set that it can be perceived by the human visual sense. Here, the dynamic change of light represents a dynamic security feature.

In the method, the property is exploited that the light changes dynamically, which applies to each of these security elements equally, regardless of which light they emit directly. An identification of individual security element taking into account the changes is, therefore, not given. If such a security element is successfully copied, then the forgery can no longer be distinguished from the original, similar is the case with copies of holograms.

In DE 10 2006 006 323 A1 is described a multi-layer body with an optically machine-readable identification, which has a plastic layer in which microscopically fine relief structures are incorporated. Thereby, different areas have different relief structures and form a background pattern that can serve as a security feature. However, this background pattern is also formed rigid between several authentication points of time.

In WO 2012/038842 is described a security element which should be forgery-proof. Here, a material is selected with a surface that exhibits "deterministic" unevenness. Further, particles are used, which are so dimensioned that they can be intercepted by the unevenness of the surface. Besides, the particles can be deposited randomly on the surface, so as to generate a complex, individual surface. The particles may exhibit, for example, a fluorescent dye so to be able to scan it via a reading device. Under a fluorescence microscope, fluorescent colours of the beads embedded in the structures can be detected. Preferably, different fluorescent dyes are used, which emit different colours when excited. In the method, a strongly individualized, yet static security element is created via random deposition, in which even the resulting static visual appearance, but not a changing appearance and any dynamic developments of the security features are compared between two authentication points of time. For this purpose, the respective final condition is fixed.

DE 10 2009 033 221 describes a security element and a method for marking, authentication or identification of objects or persons, in which at least one layer of the security element exhibits at least locally a crackle-pattern in the form of cracks or fissures, eruptions, abrasions or shrinkages as well as possible contaminants, which are scannable and ascertainable together or separately as security feature. In one embodiment, the crackle pattern can be visualized by the application of pigments (colouring), which settles in the fine cracks and fissures. Such a crackle can be visually combined according to the contamination or colouring with a normal crackle so that a total of another crackle is visible.

REPRESENTATION OF THE INVENTION

Against this background, it is an object of the present invention to provide a security device and/or an authentication method, with which protection against forgery is additionally increased by the inclusion of dynamic changes.

This object is achieved by a security device with the features of claim 1 and an authentication method with the features of claim 10. Preferred embodiments can be found in the dependent claims again.

The security device according to the invention comprises a security element which comprises a substrate, in which a three-dimensional pattern with structures such as cracks, grooves, flaking, pits, scales, elevations and/or shrinkages is embedded as static or dynamic security feature. A pattern according to the present invention comprises any structures, surfaces, geometries or unevenness in or on the substrate. Preferably, the pattern deals with "random" unevenness or structures, which are amenable to no particular order or logic. Besides, are also "wanted", predefined or symmetrical structures or forms included. The security element thus constructed can, for example, be applied on a banknote, a passport, a document, a package or an object, respectively an animal or a person. The security device further comprises a sensing device for detecting an image of the security element or of a part. The scanning device can be, for example, an optical device (e.g. camera, microscope, and scanner). In a preferred variant, the scanning device is part of a telecommunication device, such as a Smartphone or a mobile phone. Further, in the security device, a storage means for storing the image of the security element captured using the scanning device at an authentication time is preferred. The storage device can be, for example, a database, in which the transmitted data are stored on a magnetic memory or a hard disk. The authentication time is the point of time, in which an authentication of an object, a person, a service query, an access to software or any other access control, triggered by an event, is carried out. At the authentication time, the visual appearance of the security element or a part thereof is recorded and stored in the storage device. If necessary, the data obtained from the visual appearance can be modified or encrypted to make it more difficult or prevent a possible data theft. The appearance corresponds to the optical appearance and the composition of the security element, either observed with the naked eye or with the addition of auxiliaries, for example, optical scanning devices such as camera, microscope or a scanner. The auxiliaries used can ensure that the appearance can generally be seen by the human eye, for example, when working with a particular increase in the scanning device or special light.

According to the invention, it is now provided that a material or a material composition that is detectable by the scanning device is at least partially deposited on this surface, so that this or the three-dimensional pattern embedded in the substrate is dynamically changed. The deposition can be repeated as desired and is partially or completely removable. As a result, the colour, the intensity, the structure, the layer thickness, the surface or a physical property of the substrate and/or the three-dimensional pattern of the security element, embedded therein, are changed. As a result, an at least partially modified appearance arises, which is ascertainable by the scanning device at the second, subsequent authentication time and is storable as the current appearance in the storage device. The dynamic application or release of the detectable material or material composition on the substrate thus leaves a modified appearance, which differs in essential characteristics of the appearance stored in the storage device at the first authentication time point. Nevertheless, original structures of the security element are maintained so as to enable a pre-authentication of the security element. Preferably, the dynamic change, therefore, concerns only a part of the security element.

Preferably, the substrate is a matter of a coloured layer, a colour layer, a metal layer, a material with coloured pigments contained therein, metallic ions, salts or radiation-active materials. Thus, there are materials that can be detected using a scanning or detection device. Radiation-active materials are, for example, fluorescent, luminescent or radioactive materials. The storage of radioactive materials is carried out in small but in detectable concentrations, so that there is no risk to life or environment. Further, the substrate can also be coated with a protective layer, such as a protective colour layer. In a particular variant, the substrate is detectable only by the scanning device, but not visible to the unaided human eye.

Preferably, a colour layer or a layer of material with colour pigments incorporated therein is used as the substrate. Thereby, it may be preferred that the colour layer exhibits different colour intensities or colorants. This depends mainly on the type and the concentration of colour pigments and the layer thickness of the substrate. Further, light-absorbing materials, e.g. a protective layer, can be applied on the substrate, so that the colour intensity during detection using an optical device is either amplified or attenuated upon detection. Preferably, a dye is chosen, whose composition for obtaining a colour impression is known. Thereby, it is preferred that the scanning device identifies the substrate and its composition.

A layer containing metal ions, a metal layer or an alloy can be detected via suitable metal detectors. Characteristic, however, is that the substrate, and thus the appearance of the security element are changed by the incorporation or the release of the detectable material or the material composition. This change can be slow or fast, can be partial and/or temporary and further accelerated or slowed down by external influences. A temporary change exhibits a special dynamics that makes it virtually impossible for a counterfeiter to copy or use the security element. The counterfeiter does not know at a given authentication time, which current appearance at this point of time is stored in the storage device (e.g. database). The inclusion of a material or material composition results in a change of the structures of the three-dimensional pattern since either new materials are deposited in the structures or already existing materials are removed from the latter. In addition, the displacements of detectable materials can form within the structures.

To increase security, the appearance of the pattern or the pattern in the substrate is further shrunk, changed or evolved in a given period of time preferably dynamically. For example, the structures can change due to chemical or physical action, such as a detectable material or a mechanical interference, in which new cracks appear, colour fades, the layer thickness of the colour layer is changed or the existing cracks get enlarged or shrunk. If the substrate is a colour layer, the so-called crackle structures can form inside the colour layer, i.e. random cracks and fissures, which break through the closed surface structure of the substrate. In the structures formed therein, the detectable materials or the material compositions are incorporated. For this purpose, the detectable material or the material composition is preferably present as powder, granules, gel or suspension. In order to increase the complexity of the dynamic structures further, it is provided in a preferred embodiment that different types of detectable materials are incorporated in the substrate and/or the pattern. This may be either different colorants or a combination of detectable materials, which can be detected via different detection means. For example, metal particles can be mixed with colour pigments or fluorescent particles. A combination of these detectable materials further increases the security and dynamic variability of the three-dimensional pattern.

Further, different concentrations of detectable materials can be used as security feature, if they bring about a change in a physical property. Of course, the scanning device must be able to physically record different detectable materials. In one embodiment, it may be provided that at a given point of time, the surface of the security element is treated with a colour powder in liquid or dry form, whereby the individual particles are incorporated into the structures of the three-dimensional pattern. Preferably, for this purpose, a powder, a granulate, a gel or a suspension is used. A liquid suspension or a gel can easily flow into the structures of the pattern and fill them at least partially. By filling the structures with the detectable material or the material composition a modified appearance of the security element is obtained. The incorporation of the detectable material or the material composition in the substrate is preferably carried out only intermittently, i.e. as required, the powder can be removed again from the security element or falls away on its own again. In this regard, the substrate is preferably composed of a detectable material, which disintegrates over time, is detached from the substrate, is transformed in colour or is changed in other ways. Also through this, the appearance of the substrate, which is detectable by the scanning device, and/or of the embedded pattern changes.

In a preferred embodiment, the substrate of the security element is restricted by a fluorescent layer with fluorescent particles integrated therein as an additional security feature. For example, the fluorescing layer or the fluorescent layer can be located beneath the substrate. Depending on the configuration, type and thickness of the substrate, the fluorescent particles of the fluorescent layer with different intensities are visible or not visible. Based on the structure of the three-dimensional pattern, the fluorescence, respectively the fluorescent particles is/are visible at the places, where either the layer thickness of the substrate is very thin (so that the fluorescence can radiate through) or where the substrate has structures like cracks, scales, grooves or eruptions, so that the fluorescence, respectively the fluorescent particles are detectable by these structures. If during the second, subsequent authentication point of time, the detectable material or the material composition is newly deposited on the security element or removed from this, then the appearance of the restricting fluorescent layer, respectively the fluorescent particles incorporated therein changes. Fluorescent particles that were previously visible and shine through a structure of the three-dimensional pattern are sealed off with a superimposed structure and are, therefore, no longer visible or only with lower intensity. Thus, in a preferred variant it is provided that the fluorescent particles of the fluorescent layer are visible primarily through the structures of the pattern, or through areas of the substrate with lower or more transparent layer thickness than the surrounding material. For the purpose of the present invention, any fluorescent dyes can be used. The detectable material or the material composition can have in a variant the same material composition as the substrate.

The scanning with the scanning device can be made with different angles or views. Preferably, during scanning, three-dimensional depth information is obtained from the structures of the substrate. This can be done, for example, via photometric methods, for example by means of creating a height field, the application of structured light, different angles of illumination or by stereo photography. Besides, the interferometer or reflected light microscopes offer similar results. The addition of depth information represents an additional security feature, since they reproduce the three-dimensional structure faithfully, making it virtually impossible for a counterfeiter to reconstruct this information.

In a further preferred embodiment, the security element is scanned with rays of varied excitation wavelengths. Thus, the appearance of the security element visible to human eye seem wholly different, depending on the radiation source appear, for example, when the security element is analysed comparatively with natural light, polarizing light or fluorescent light. The fine contours and shadows of the substrate, the structures of the pattern and the layer thickness of the substrate give rise to, under polarizing light, an individual appearance, which is different from the appearance produced by non-polarized normal light or the fluorescence image.

Depending on the radiation source it contains appearances that are completely different from the same security element, which, however, depend on one another. If the composition or structure of the support layer, the pattern or the fluorescent layer is changed, then the visual appearances change also necessarily at least partly, which are obtained in an analysis under normal light, polarizing light or fluorescent light. The appearance of images obtained via individual radiation sources are detected at time of query and stored in a database. Additional security is obtained through data sharing, i.e. the appearance of images would be stored in different databases. In an authentication request, a query could be sent to the respective databases, wherein for authenticating one or more appearances are consulted. The combination and uniqueness of these appearances make it virtually impossible for a forger to copy the security element with a reasonable effort.

A particular feature of the authentication method of the invention is further to be seen that the detectable material or the material composition dynamically changes the three-dimensional pattern embedded in the substrate, in which, if necessary, the material or the material composition is newly applied or removed on the security element through an inner or outer influence, whereby the colour, the intensity, the structure, the layer thickness or other physical property of the substrate and/or the three-dimensional pattern of the security element, embedded therein, change at least temporarily. The incorporation or detaching of the materials into the structures of the substrate leads to an altered appearance, which is at least partially different from the appearance at an earlier point of time. Thus, due to the application or detachment of the detectable material or the material composition different appearances of the same security element is obtained between two authentication points of time. Besides, even properties of the substrate itself, of the three-dimensional pattern or of the fluorescent layer adjacent to the substrate can change. For example, cracks in the structure of the three-dimensional pattern can enlarge, evolve or shrink. Further, new cracks or other structures can be formed. The temporary incorporation of a detectable material or a material composition of the three-dimensional pattern also causes a change in the adjacent fluorescent layer. Thus, there is a combination of security features, which can be used as an authentication feature together or individually.

BRIEF DESCRIPTION OF DRAWINGS

The invention is further illustrated with the help of the following drawings.

WAYS OF CARRYING OUT THE INVENTION AND INDUSTRIAL APPLICABILITY

Figure 1:
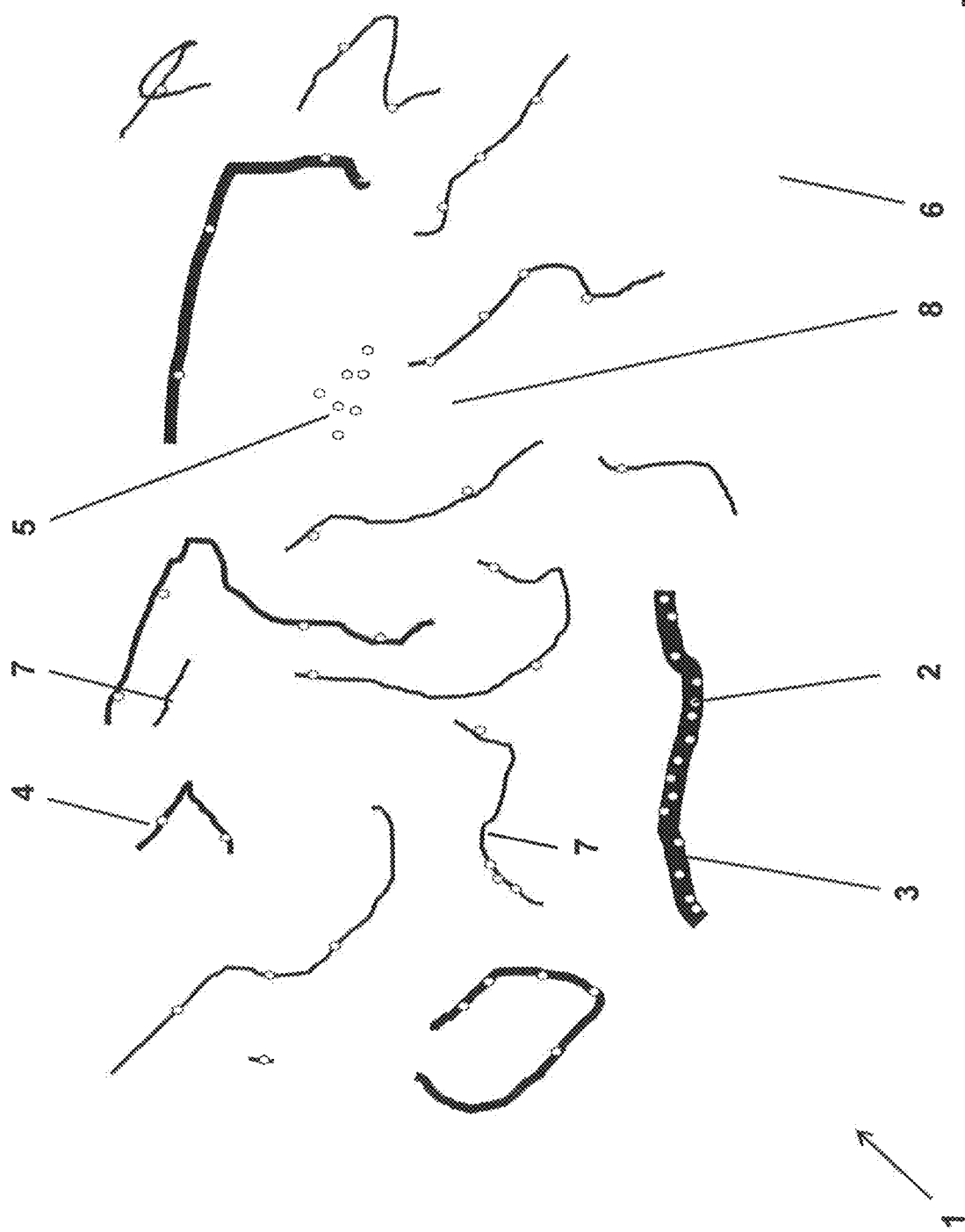
In FIG. 1 is shown a security element 1 comprising a base plate and a substrate 6. The substrate 6 is a colour layer which contains coloured pigments. In the substrate 6, there are different geometric patterns 4, which are illustrated in the embodiment shown as cracks and eruptions. Such cracks or eruptions can occur, for example, due to drying or shrinking of individual areas of the colour layer. Below the colour layer as a substrate 6 there is a fluorescent layer 3, in which individual fluorescent particles 2 are arranged. Due to the crack formation in the substrate 6 (colour layer), fluorescent particles 2 are detectable by the structures of the geometric pattern 4. The fluorescent particles 2 are visible in particular in those places where no substrate 6 is present or at the locations where the layer thickness of the substrate 6 is very low. Such areas of low film thickness 5 lead to the fact that the fluorescence of the fluorescent particles 2 can pass through and is detectable by the scanner device. Besides, there are shadings 7 that can occur in areas of the pattern 4 and also form a characteristic structure or an appearance. Finally, there are also areas in the substrate 6, in which individual pigments or pigment accumulations 8 are highlighted stronger or weaker than the surrounding areas of the substrate 6.

For dynamic modification of the security element, a colour powder is applied in a further step onto the substrate 6, which incorporates in the structure of the geometric pattern 4 or of the substrate 6 and covers single or multiple fluorescent particles 2 or brings in new ones. By treating the security element 1 with powder paint, not only the structure of the geometric pattern 4 but also the intensity of the fluorescent particles 2 is altered. Besides, under circumstances, changes in layer thickness of the substrate 6 occur, so that the earlier fluorescent areas with low layer thickness 5 are shielded such that the underlying fluorescent particles 2 can no more shine through.

For detaching the colour powder, the security element can be knocked off, so that the colour powder or parts thereof can again come loose from the structures of the geometric pattern 4. This in turn causes a change in the appearance, which can be detected by the scanner device at the time point of query.

Figure 2:
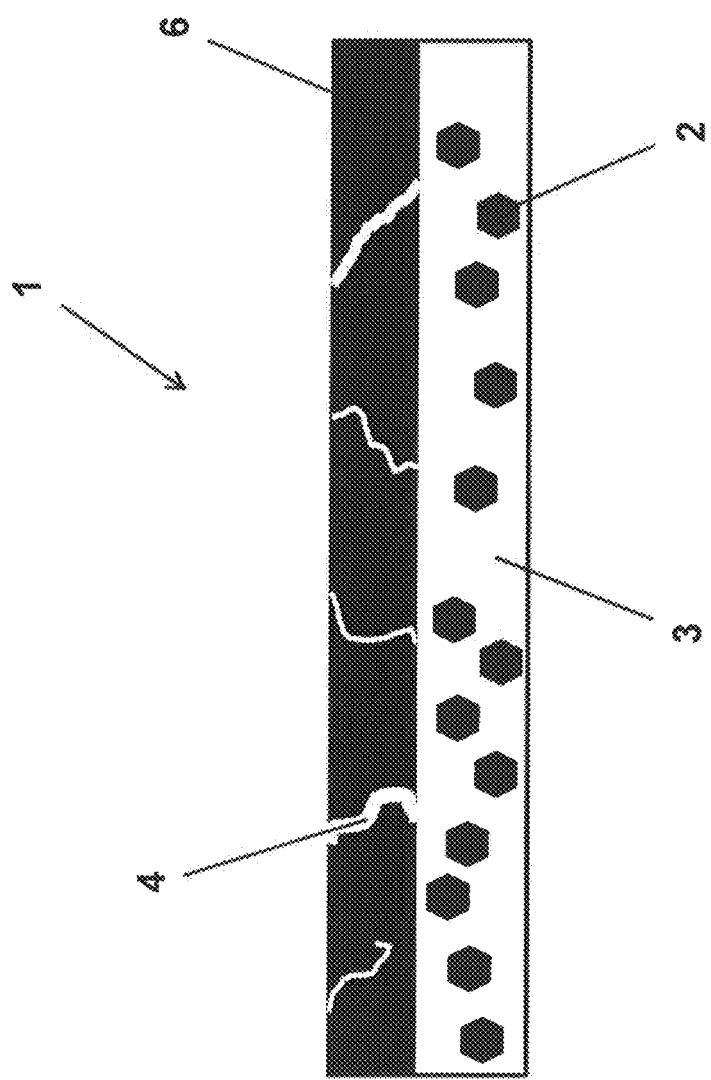

FIG. 2 is shown the security element 1 in cross-section. Underneath a colour layer, a fluorescent layer 3 is formed as a substrate 6, in which individual fluorescent particles 2 can be seen. In the substrate 6 are located random structures 4 such as cracks and fissures, which are formed in the colour layer. Through these structures 4, the fluorescent particles 2 radiate their fluorescence up to the surface and are, therefore, detectable during control. When applying a colour powder or a detectable material, the structures 4 are filled in part, whereby an altered appearance is created, which changes the position and the intensity of the fluorescence of the fluorescent particles 2 during scanning with a scanning device.

Figure 3:
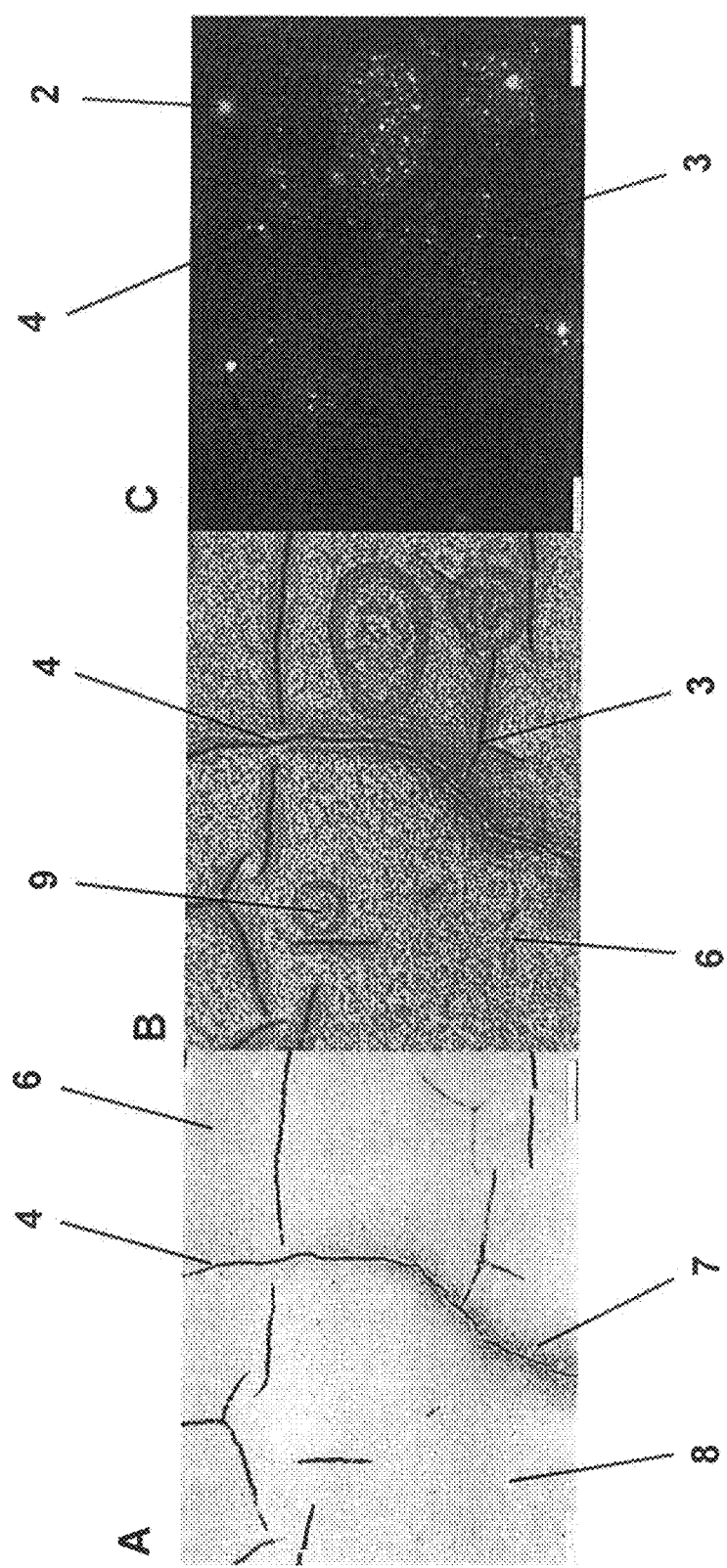

In FIG. 3 is shown a security element in two-layer structure (a colour layer as carrier layer 6 and the underlying fluorescent layer 3), which has been scanned with different light. The result of such an analysis with different radiation sources is shown in FIGS. 3A-C. FIG. 3A shows the appearance of the security element, which was recorded under normal light. Here, the individual cracks as pattern 4 in the (carrier layer 6) are clearly seen. Even the areas with shadings 7 and pigment accumulations 8 can be recognized in the carrier layer. FIG. 3B shows the appearance of the same security element, which was recorded with polarizing light. Areas with specific fluorescence accumulations exhibit a characteristic ring structure 9. FIG. 3C shows the appearance of the security element, when this is created by a fluorescence image. In the embodiment example, two different fluorescent dyes were used (not visible), which exhibit different colour schemes. Individual fluorescent particles 2 and their accumulations within the fluorescent layer 3 can be clearly recognized. In addition, other fluorescent particles 2 can be seen in a different colour within the pattern 4 and in the areas of the substrate 6 with a lower layer thickness. If all three appearances of FIG. 3A-C, are, for example, assigned to a document of value, a person or a service, then it is virtually impossible for a forger to copy the security element, since, as a consequence, all three manifestations of the security element had to be copied true to the original.

The invention claimed is:
1. A security device comprising
   a security element (1), which comprises a substrate (6), in which a three-dimensional pattern with structures (4) such as including cracks, grooves, flaking, pits, scales, elevations and/or shrinkages, are embedded as a static or dynamic security feature,
   a scanning device for capturing an image of the security element or a part thereof,
   a storage device for storing the image of the security element captured with the scanning device at an authentication point of time, wherein additionally a material that is detectable via the scanning device or a material composition, deposited or embedded in or on the three-dimensional pattern embedded in the substrate (6) and, if necessary, on the security element newly applicable or removable, such that the colour, the intensity, the structure, the layer thickness, individual pigments or other physical property of the substrate (6) and/or the three-dimensional pattern of the security element (1), embedded therein, are changed, so that at least a partially altered appearance is obtained which is detectable during an authentication point of time by the scanning device and is storable in the storage device, characterized in that the substrate (6) of the security element (1) is restricted by a fluorescent layer (3) having fluorescent particles (2), integrated therein or an arbitrarily fluorescent dye, as an additional security feature, wherein the intensity, as captured by the scanning device, the shape, the arrangement or any other characteristic of the fluorescent particles (2) or of the fluorescent dye of the fluorescent layer (3) are influenced by the configuration or the structure of the pattern in the substrate (6) and/or the colour, the intensity, the structure, the layer thickness or other characteristic of the substrate,
   wherein the substrate is changed by the incorporation or the release of the detectable material or the material composition.

2. The security device according to claim 1, characterized in that the appearance of the pattern or the pattern in the substrate (6) changes, shrinks or further develops dynamically in a specified period of time.

3. The security device according to claim 1, characterized in that different detectable materials are embedded in the substrate (6) and/or in the pattern.

4. The security device according to claim 1, characterized in that the substrate (6) is a matter of a coloured layer, a colour layer, a metal layer, a material with colour pigments contained therein, metal ions, salts or radiation-active materials, or a combination of these elements.

5. The security device according to claim 1, characterized in that the material that is detectable by the scanning device or the material composition is only temporarily stored in the three-dimensional pattern embedded in the substrate (6).

6. The security device according to claim 1, characterized in that the substrate (6) contains a dye, which has a composition that is detectable via the scanning device.

7. The security device according to claim 1, characterized in that the substrate (6) consists of a material detectable by the scanning device, which disintegrates temporally, is detached from the substrate (6), is converted in colour or is changed in another manner, such that the scanner-detectable appearance of the substrate (6) and/or of the pattern are changed.

8. The security device according to claim 1, characterized in that the fluorescent particles (2) of the fluorescent layer (3) are visible mainly through the structures (4) of the pattern or through the areas of the substrate with lower or transparent layer strength (5) than the surrounding material.

9. The security device according to claim 1, characterized in that additional markings on the security element (1) are provided for determining the camera angle of the scanning device.

10. The security device according to claim 1, characterized in that additionally an action means is provided, with which the substrate (6) is partially or completely alterable, removable or newly applicable on this action means by the security element (1).

11. An authentication method in which a security element is used, which comprises:
   providing a substrate, in which a three-dimensional pattern with structures including cracks, grooves, flaking, pits, scales, elevations and/or shrinkages are embedded as a static or dynamic security feature;
   depositing a detectable material or a material composition is at least partially deposited or stored in the three-dimensional pattern embedded in the substrate;
   reapplying or removing on/from the security element through an internal or external influence, such that the colour, the intensity, the structure, the layer thickness, individual pigments or other physical property of the substrate and/or of the three-dimensional pattern of the security element, embedded therein, are changed;
   obtaining at least a partially altered appearance is obtained, which is recorded at the authentication point of time by a scanning device and transmitted to a storage device and stored there, characterized in that a fluorescent layer comprising fluorescent particles, integrated therein, is arranged as an additional security feature at the substrate of the security element, wherein the scanning device-detected intensity, shape, arrangement or other characteristic of the fluorescent particles of the fluorescent layer is influenced by the arrangement or structure of the pattern in the substrate and/or the colour, the intensity, the structure of the layer thickness or another characteristic of the substrate,
   wherein the substrate is changed by the incorporation or the release of the detectable material or the material composition.

12. The authentication method according to claim 11, characterized in that, for creating a dynamic security element with a changing appearance, the material that is detectable by the scanning device or the material composition in the substrate or in the pattern of the security element is temporarily disintegrated by the external or internal influences, at least partially removed or replaced, will be displaced on the security element, or separated from the security element.

13. The authentication method according to claim 11, characterized in that for creating a dynamic security element with an altered appearance, the substrate is applied or newly added in liquid or dry form on the security element as a powder, as a lacquer, as an adhesive or as a colour mixing.

14. The authentication method according to claim 11, characterized in that the scanning device creates a three-dimensional image of the security element or a part thereof.

15. The authentication method according to claim 11, characterized in that the scanning is performed using light of different wavelengths, polarizing light and/or fluorescent light.

16. The authentication method according to claim 11, characterized in that in a fluorescent layer is incorporated a detectable material or a material composition which exhibits the same material composition as the substrate.

\* \* \* \* \*